United States Patent [19]

Delebecque

[11] Patent Number: 4,529,266
[45] Date of Patent: Jul. 16, 1985

[54] DEVICE FOR ARRAYING THE ENDS OF OPTICAL FIBERS SPACED OUT AROUND AN AXIALLY SYMMETRICAL STRUCTURE

[75] Inventor: Robert P. Delebecque, Chatenay Malabry, France

[73] Assignees: Societe Anonyme De Telecommunications; Societe Industrielle De Liaisons Electriques, both of Paris, France

[21] Appl. No.: 436,416

[22] Filed: Oct. 25, 1982

[30] Foreign Application Priority Data

Oct. 27, 1981 [FR] France .................. 81 20171

[51] Int. Cl.³ .............................................. G02B 5/16
[52] U.S. Cl. .................................. 350/96.23; 29/868
[58] Field of Search .............. 350/96.21, 96.22, 96.23; 29/868, 869, 873

[56] References Cited

U.S. PATENT DOCUMENTS 4,148,559 4/1979 Gauthier .................. 350/96.21

*Primary Examiner*—William L. Sikes
*Assistant Examiner*—Robert E. Wise
*Attorney, Agent, or Firm*—Lowe, King, Price & Becker

[57] ABSTRACT

Ends of optical fibers spaced around an axially symmetrical structure are arrayed by a device including an integral thin dividing member substantially disposed transversely to the structure. The dividing member has openings and dead-end channels communicating with the openings. The channels are substantially perpendicular to the structure and have bottoms aligned along a fiber end alignment axis. The fiber ends freely pass through the openings and are pushed substantially perpendicularly to the structure from the openings to the bottoms of the respective channels to array the fiber ends along an alignment axis.

20 Claims, 14 Drawing Figures

DEVICE FOR ARRAYING THE ENDS OF OPTICAL FIBERS SPACED OUT AROUND AN AXIALLY SYMMETRICAL STRUCTURE

BACKGROUND OF THE INVENTION

The present invention relates to a device for arraying, i.e. laying in planar form the ends of optical fibers spaced out around an axially symmetrical structure.

The arraying device is more particularly intended for positioning the optical fiber ends parallel on a plane, the optical fibers being equi-distributed around a grooved ring of a cylindrical cable that has been stripped for the purpose of connecting it to another optical fiber cable.

SUMMARY OF THE INVENTION

The arraying device comprises a dividing member having openings through each of which an optical fiber will pass and that are extended by channels whose ends are aligned along an axis. This axis defines the layout of the plane where the fibers are to be held in a coplanar and parallel fashion with a view to laying them on the flat holder, generally grooved, of a connecting device for joining the fibers of two linear arrays end to end.

Means, such as sliding members parallel to the dividing member and having V-shaped opposite edges, are provided in order to push the fibers from the openings into the bottoms of the respective channels. Once the fibers are in the bottom of the channels, they are held in a parallel and coplanar position in the dividing member.

However, so that they may be held together at a later stage in such mutual positions over a significant length, the invention further provides means such as a comb which maintains the fibers as is in front of the dividing member. Relative movement of the comb with respect to the dividing member enables to comb the fibers parallel along a plane. After this, the fibers between the comb and the dividing member may be laid on a suitable plane aligning holder or are held together by adhesive tape or bonder.

BRIEF DESCRIPTION OF THE DRAWING

Other features and advantages of the present invention will become clear from the following detailed description of preferred embodiments of the arraying device with reference to the accompanying correspondent drawings in which.

DESCRIPTION OF THE PREFERRED EMBODIMENTS

For a clearer understanding of the invention, a description will first of all be given of the initial and final positions of the optical fiber ends of a cylindrical cable where the transition from one position to the other is obtained using the arraying device embodying the invention.

Figure 1:
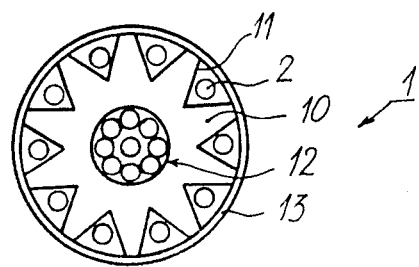
FIG. 1 is a cross-sectional view of an optical fiber cable with a grooved cylindrical ring.

It is assumed that the fiber cable 1 comprises ten cylindrical shaped optical fibers 2 that are equally spaced out around the grooved circumference of an axially symmetrical structure such as a cylindrical ring 10. Each groove 11 is generally helicoidal and contains one optical fiber 2, as shown in FIG. 1, or several optical fibers depending on the cable type used. The cable usually comprises a steel-wire carrier 12 at the center of ring 10 and a sheathing 13 generally composite around the ring 10. The external jacket of the sheathing 13 is made up of wound tape. The invention may also be applied to other axial symmetrical cables such as those in which the optical fibers run inside individual sheaths twisted inside the composite sheathing.

Figure 2:
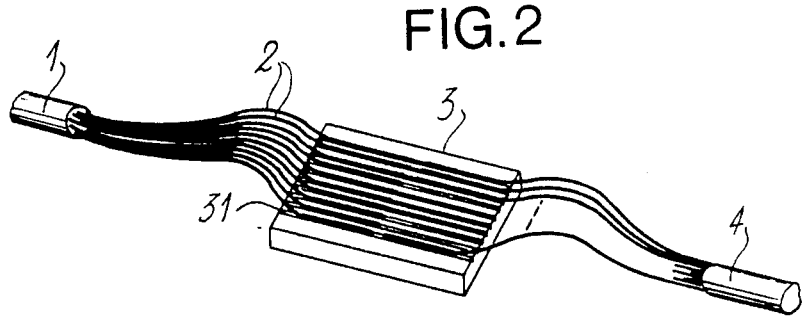
FIG. 2 is a schematic perspective view of a planar holder for connecting two optical fiber cables.

The device for connecting two linear arrays of optical fibers comprises in particular a flat holder 3, one of the plane major faces of which has generally V-shaped aligning grooves 31 as shown in FIG. 2. Grooves 31 are longitudinal, parallel, equidistant and coplanar. In the final position once the cable sheathing has been removed, the ends of fiber 2 are laid in the bottom of respective aligning grooves 31 and held there by bonding, for example, over the first half of holder 3. The other half of holder 3 supports the ends of the optical fibers from another cable 4 to be connected. The connecting device comprises suitable means for bearing holder 3, splitting it into two halves, levelling off its halves and the fiber ends and joining them in order to butt the fibers of cables 3 and 4 end to end.

Figure 3A:
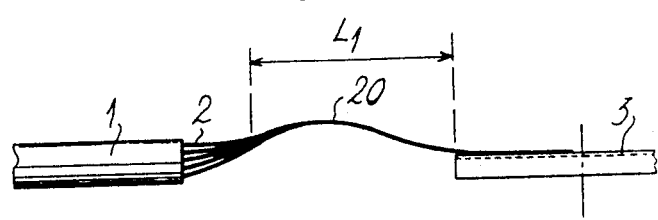
FIG. 3 shows the bell-shaped curvatures applied to the ends of optical fibers in a cable awaiting connection.
Figure 3B:
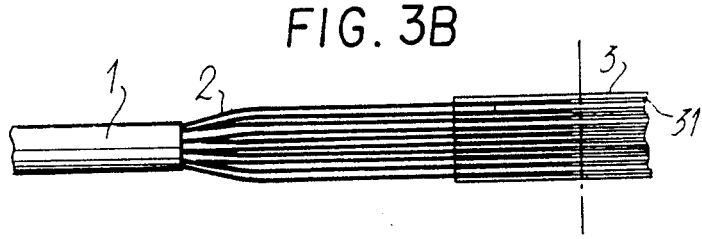

It will be observed in reference to FIG. 3 that the fanned out optical fibers leaving grooves 11 of cut off ring 10 can be curved into a bell-shaped form 20 between the end of the ring and their coplanar ends over a length $L_1$ leading up to the appropriate half of holder 3. These bell-shaped curvatures are designed to absorb any differential expansions of the components making up the connecting device.

The fiber arraying device embodying the invention also makes it possible to position the optical fibers, initially spread around cylinder, flat side-by-side, spaced out the fiber ends in an equidistant coplanar fashion, distinguish between the various fibers and also, if required, to bend the fibers to give a bell-shape.

Figure 4:
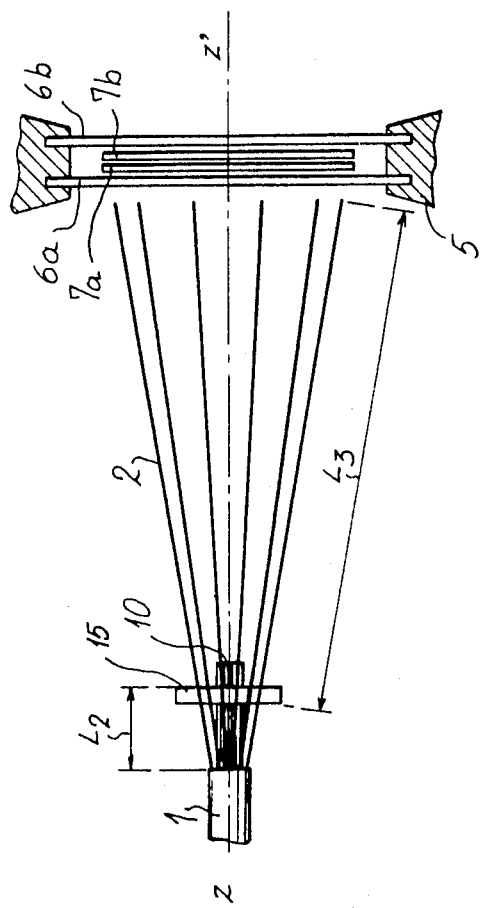
FIG. 4 is a schematic side view along the longitudinal axis ZZ' of the arraying device as the fibers are introduced through the divider openings.

The fiber arraying device is schematized in FIG. 4. A divider 6a, or preferably, two identical superposable and parallel dividers 6a, 6b are secured to a frame 5 which is movable on the base of the device.

Figure 5:
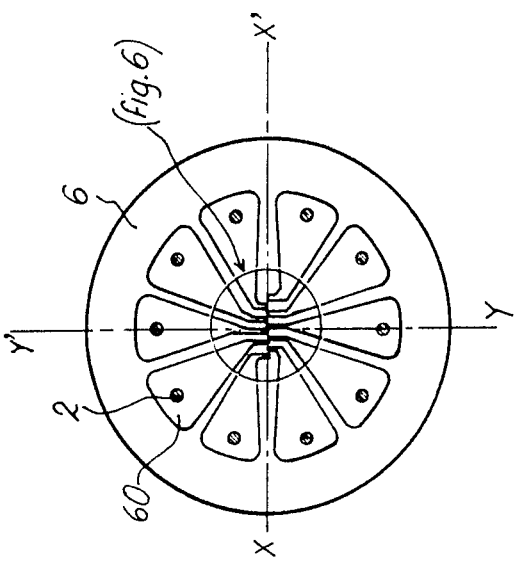
FIG. 5 is a front view of a divider.
Figure 6:
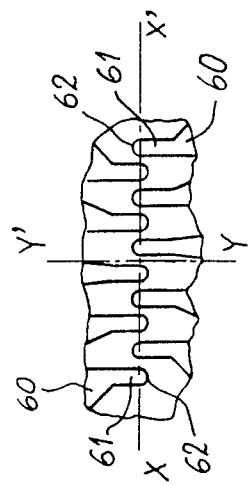
FIG. 6 is a detailed front view, on a greater scale than FIG. 5, showing how the channels are spaced out along the transversal axis XX'.

As depicted in FIG. 5, each divider 6 consists of a thin disc that has a number of cut-out openings 60 equal to or greater than the number of optical fibers 2 of cable 1 to be connected. An individual optical fiber is intended to pass through each opening. Openings 60 are in the form of circle sectors and are equally spaced out around the center of the divider. The tapered ends of sectors 60 are extended by respective dead-end channels 61 that are perpendicular to the horizontal diametrical axis XX' of divider 6. The width of each channel is substantially greater than the diameter of an optical fiber 2 and can be obtained by laser beam machining. These channels 61 are shown in detail in FIG. 6. The bottom 62 of each channel 61 is situated on the opposite side of the axis XX' compared to respective sector 60 from which it stems. All the channel bottoms on the same side of axis XX' are aligned parallel to the axis XX' and lie at a distance from the axis XX' substantially equal to the radius of an optical fiber. Channels 61 stemming from two sectors 60 symmetrically opposed across the axis XX' are adjacent and the gap between two adjacent channels is equal to that between two aligning grooves 31 in holder 3. As a result of this arrangement, when fibers in the openings are pushed into the bottom of channels 61, their axes are aligned along axis XX'. To be more precise, the fibers are coplanar between the two-by-two parallel channels of dividers 6a and 6b.

Figure 7:
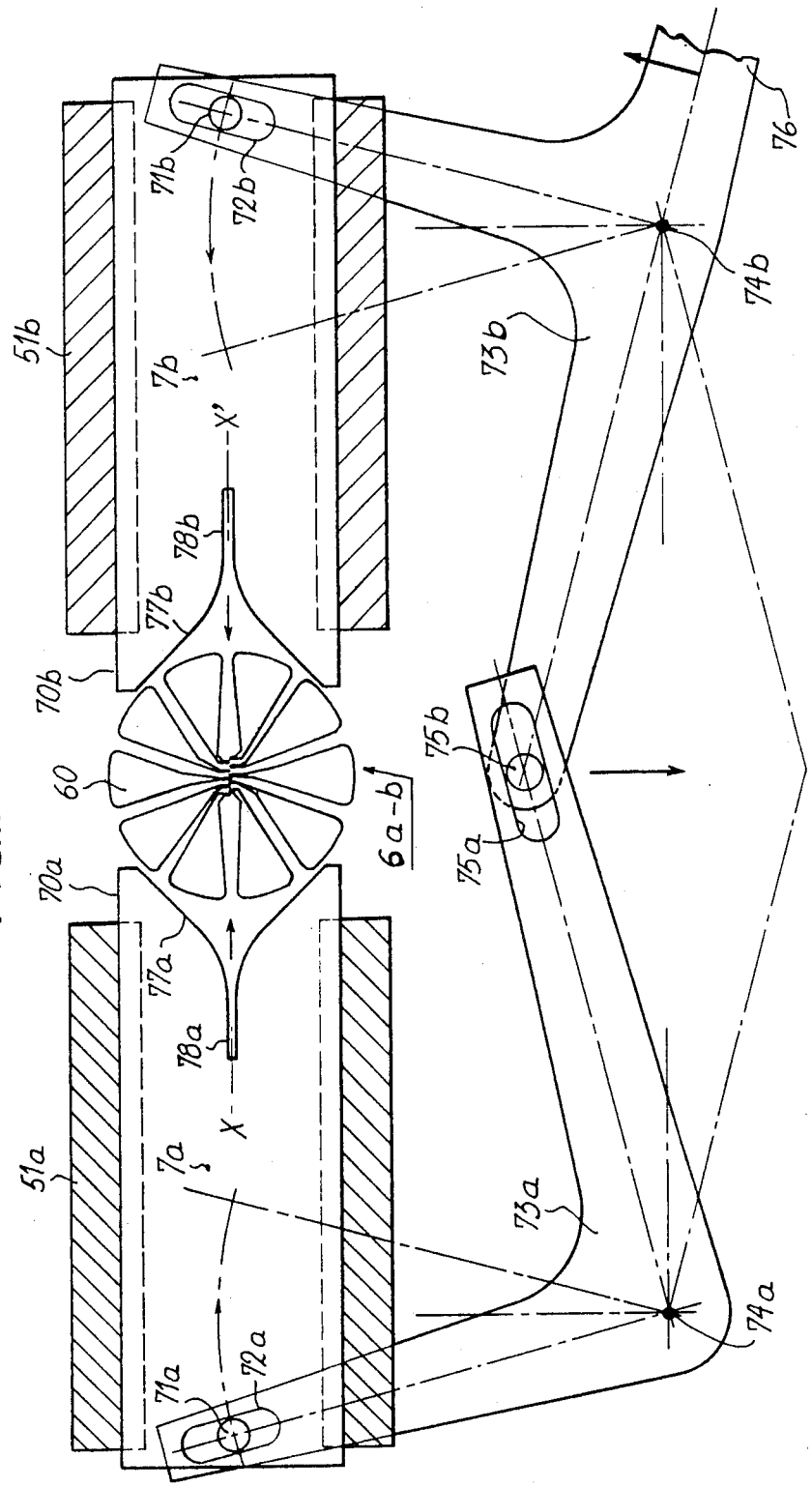
FIG. 7 is a front cross-sectional view of the arraying device showing the means for pushing the fibers into the divider channels.

The arraying device further comprises means for pushing fibers from respective openings 60 into bottom 62 of respective channels 61. The fiber pushing means are illustrated in FIGS. 4 and 7 and consist mainly of two identical sliding members 7a, 7b that can be moved translationally simultaneously one towards the other parallel to the axis XX' and to the faces of dividers 6a, 6b and between the latter using a system of levers.

Each sliding members 7a, 7b consists of a rectangular plate whose long edges 70a, 70b slide in two guides 51a, 51b cut into frame 5 parallel to the axis XX'. The far ends of sliding members 7a, 7b carry two studs 71a, 71b that are lodged in oblong slots 72a, 72b of arms of two respective right-angular levers 73a, 73b. Corners 74a, 74b of levers 73a, 73b are rotatively mounted on frame 5 and are symmetrical with respect to the diametrical plane YY' of dividers 6a, 6b perpendicular to the axis XX'. The ends of the other arms of the levers 73b, 73a respectively comprise a stud 75b and an oblong slot 75a cooperating together. One of the levers, such as 73b, turns and causes the reverse rotation of the other lever 73a due to the force exerted at 76 by a handle or the shank of a known electromagnetic unit such as an actuator or an electomagnet. As can be seen in FIG. 4, the planes through which sliding members 7a and 7b slip are parallel and close together in order that the ends opposite the sliding members may overlap.

Ends 77a, 77b of sliding members 7a, 7b opposite the axis XX' have a re-entrant V-shaped notch. The tip of each notch 77a, 77b is extended by a rectilinear slit 78a, 78b. The longitudinal axes of slits 78a, 78b are coplanar and parallel to the axis XX'. The length of a slit is equal to at least the distance between the two channels 61 at the ends of dividers along the axis XX'. A slit is practically as wide or wider than the diameter of optical fiber 2.

Figure 9:
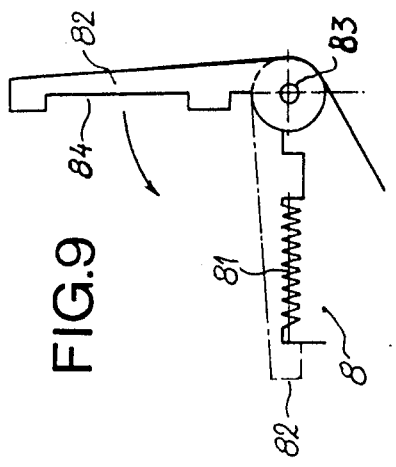
FIG. 9 is a front view of the comb and the associated hinged lever.
Figure 8:
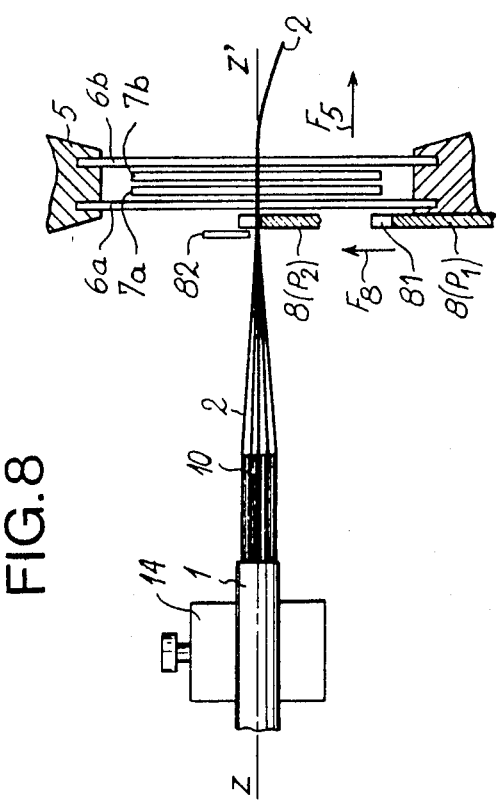
FIG. 8 shows the comb sliding into contact with the fibers.

As shown in FIGS. 8 and 9, the arraying device comprises means for holding the fibers in a coplanar and parallel fashion when combing great lengths, as will be seen hereinafter. These holding means consist of a comb 8 that can slide perpendicularly to the axis XX' in a vertical guiding member fixed to the device base, for instance by means of a rack. The upper end of comb 8 has V-shaped notches 81 spaced out in an identical manner to aligning grooves 31 in holder 3 and channels 61 of dividers 6a, 6b. Added to the comb is a lever 82 hinged at 83 laterally on the comb, about an axis perpendicular to the divider faces. When the apices of notches 81 of the comb are virtually aligned with bottoms 62 of lower channels 61 (FIG. 6) of the dividers after the comb has climbed in the direction of the arrow $F_8$ (FIGS. 8 and 9), lever 82 is lowered to the horizontal position so as to lay the fibers into notches 81 and hold them there. Edge 84 of lever 82 in contact with the fibers can be rectilinear, as shown, or serrated symmetrically with 81 of the comb when edge 84 and serration 81 lie along the divider common central axis ZZ', or perhaps with serrations complementary to 81 of the comb when edge 84 is applied above serration 81.

The arraying device further comprises means for relative translation moving frame 5 with respect to comb 8 along the direction of the axis ZZ'. The relative translation moving means—not shown—consist of two independent rack and gear systems driving a carriage guided on the base of the device and respectively moving frame 5 or comb 8 along the axis ZZ'.

A description follows now of linear arraying the ends of optical fibers in the cable to be connected.

The optical fiber cable is gripped in a suitable clamp 14, and the sheathing is removed over a length $L_2+L_3$, as depicted in FIG. 4. Optical fibers 2 are freed from grooves 11 in cable ring 10. Ring 10 and carrier 12 are cut off to a length $L_2$ from the end of sheath 13. A collar 15 is slipped around ring 10. This collar has peripheral grooves similar to grooves 11 in the ring but spaced out equally around a larger diameter circle. The collar 15 grooves preferably run along equidistant generating lines of a truncated cone converging on the cable. The fibers are then fanned out conically by laying them under their bending moments in the grooves of collar 15, as in FIG. 4.

The cable end thus prepared makes it possible to distinguish between fibers 2 by numbering sectors 60 in dividers 6a and 6b and to introduce them into these sectors, one fiber per sector, as illustrated in FIG. 5.

Figure 10:
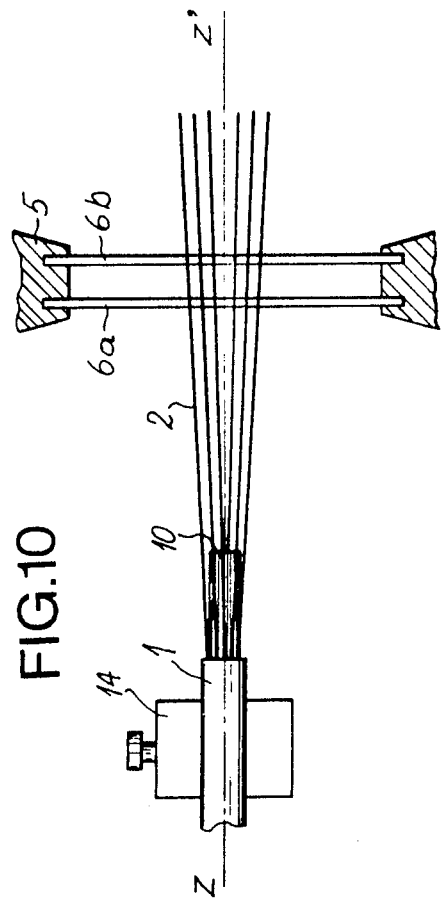
FIG. 10 is a side view analogous to FIG. 4 once a collar has been withdrawn to fan the fibers out.

Collar 15 is removed and fibers 2, once freed, close in on the divider central axis ZZ' due to their own bending moment, as roughly shown in FIG. 10.

Figure 11:
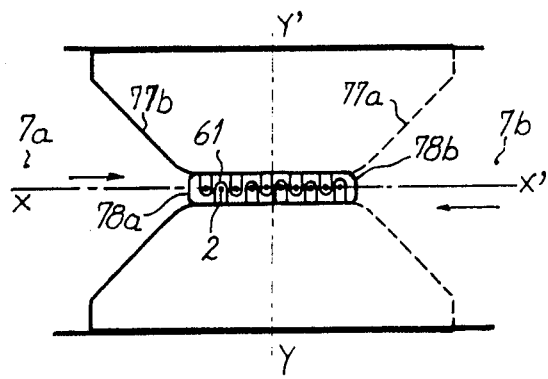
FIG. 11 is a schematic front view showing the superposition of the sliding member slits and the divider channel bottoms as the fibers are being aligned.

The system of levers 73a and 73b is displaced at 76 (FIG. 7) such that slits 78a and 78b of sliding members 7a and 7b overlap and become surrounded by divider channels 61, as shown in FIG. 11. During opposed translational movements of sliding members 7a and 7b, the sides of V-shaped notches 77a and 77b push the ends of optical fibers 2 into channels 61 of dividers 6a and 6b bringing them finally together in the bottoms of channels 61 along the axis XX'.

At this stage, the optical fibers are coplanar and emprisoned in bottoms 62 of channels 61, on the one hand, and in slits 78a, 78b of sliding members 7a, 7b, on the other hand, in positions which correspond exactly to those on flat holder 3 (FIG. 2).

Comb 8 is initially drawn back at $P_1$ from the axis XX' and in the immediate proximity of divider 6a that is opposite ring 10. The comb 8 slides upwards until the apices of its notches 81 reach the optical fibers at position $P_2$, as shown in FIGS. 8 and 9. The comb teeth insert themselves between the fibers which are trapped in the bottoms of respective notches 81 by lever 82 being horizontally brought down and locked onto comb 8.

The fibers are then combed starting from comb 8 by a translational movement of frame 5 carrying dividers 6a, 6b along the axis ZZ' towards the ends of the fibers per the arrow F5, using the respective translation moving means, not shown, but already mentioned. Fibers 2 are thus held parallel, at equal distances in a coplanar fashion over a length L3 separating com 8 from divider 6a, as indicated in FIG. 12.

Figure 12:
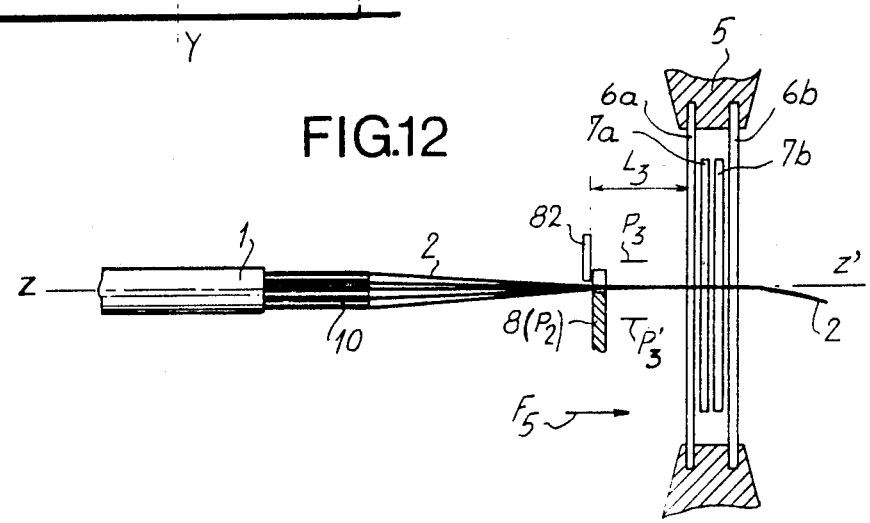
FIG. 12 is a view analogous to FIG. 8 after relative movements of the comb and the divider frame.

Comb 8 and folded-down lever 82 are again moved above the axis XX' to position P3 shown in FIG. 12—or dropped to a lower symmetrical position P3'—such that fibers 2 between cable 1 and divider 6a assume a bell-shaped currature 20 (FIG. 3). It will be appreciated that fibers 2 are practically hemmed in between comb 8 and lever 82 whereas they can slip with slight friction in channels 61 of dividers 6a, 6b and slots 78a, 78b of sliding members 7a, 7b.

Figure 13:
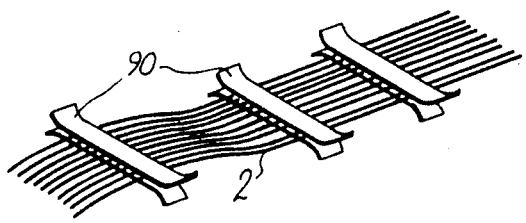
FIGS. 13 and 14 schematize how fibers are hold in a linear array by adhesive strips or bonders once the fibers have been combed as in FIG. 12.
Figure 14:
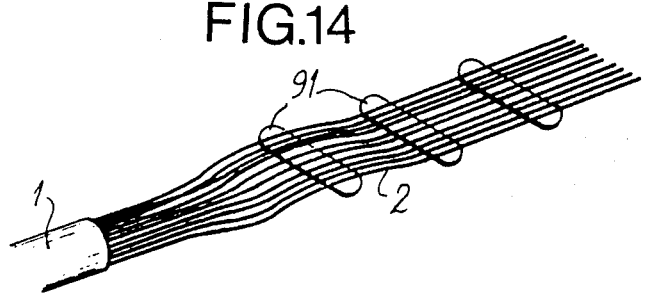

Once the previous step of combing and curving the fibers has been completed, they are then held in their relative array positions thus obtained between cut ring 10 and divider 6a. This can be achieved using pairs of strips or adhesive tapes 90 struck together, trapping the optical fibers, as shown in FIG. 13. It can also be achieved by high viscosity and fast polymerization resin coating followed by quick curving in strips 91, as in FIG. 14.

Lastly, the fibers thus joined together in a linear array are removed from the arraying device by lifting lever 82, dropping comb 8, withdrawing sliding members 7a and 7b in opposite directions and sliding divider frame 5 away from the cable or pulling the fiber array. The array of fibers 2 is now ready to be positioned in the fiber connecting device.

What I claim is:

1. A device for arraying the ends of optical fibers spaced out around an axially symmetrical structure, said device comprising a dividing member having openings through each of which a respective optical fiber runs and that respectively communicate with channels having ends aligned along an axis, and means for pushing the fibers from said respective openings into the bottoms of said respective channels.

2. A device as claimed in claim 1 wherein said fiber pushing means comprises two sliding members parallel to said dividing member and having opposite re-entrant V-shaped edges with apices extended by slits having their longitudinal axes parallel and coplanar with said axis, and means for moving said sliding members in opposite directions parallel to said axis.

3. A device as claimed in claim 2 wherein the width of said slits of said sliding members is substantially equal to the diameter of said optical fibers.

4. A device as claimed in claim 2 wherein said sliding member moving means comprises two levers each having one end cooperating with one of said sliding members and the other end cooperating with said other end of the other lever.

5. A device as claimed in claim 1 comprising a frame in which said dividing member and said fiber pushing means are lodged.

6. A device as claimed in claim 1 wherein said fiber pushing means is lodged between said two dividing members.

7. A device as claimed in claim 1 comprising means for holding said optical fibers in the proximity of said dividing members in a coplanar and parallel fashion.

8. A device as claimed in claim 1 comprising a second dividing member, parallel and superposable on said other dividing member, said fiber pushing means being lodged between said two dividing members.

9. A device for arraying the ends of optical fibers spaced around an axially symmetrical structure, said device comprising a dividing member having openings through each of which a respective optical fiber runs and that respectively communicate with channels having ends aligned along an axis, means for holding said optical fibers in promimity to said dividing member in a coplanar and parallel fashion, said fiber holding means comprising a comb having a notch distribution similar to that of said channels and parallel to said axis, and means for moving said comb perpendicularly to said axis.

10. A device as claimed in claim 9 comprising means connected to said comb for laying the fibers in the bottoms of said comb notches.

11. A device for arraying the ends of optical fibers spaced out around an axially symmetrical structure, said device comprising a dividing member having openings through each of which a respective optical fiber runs and that respectively communicate with channels having ends aligned along an axis, means for pushing the fibers from said respective openings into the bottoms of said respective channels, a frame in which said dividing member and said fiber pushing means are lodged, means for holding said optical fibers in proximity to said dividing member in a coplanar and parallel fashion, and means for moving said frame with respect to said fiber holding means perpendicularly to said axis.

12. A device for arraying ends of optical fibers spaced around an axially symmetrical structure, said device comprising an integral thin dividing member substantially disposed transversely to said structure, said dividing member comprising openings and dead-end channels communicating with said openings respectively, said channels being substantially perpendicular to said structure and having bottoms aligned along a fiber and alignment axis, said fiber ends freely passing through said openings and being pushed substantially perpendicularly to said structure from said openings up said channel bottoms respectively, thereby arraying said fiber ends along said alignment.

13. A device as claimed in claim 12 wherein said openings are equally spaced out circularly.

14. A device as claimed in claim 13 wherein two channels extended opposite openings with respect to said axis are adjacent.

15. A device as claimed in claim 12 wherein said channels are perpendicular to said axis.

16. A device as claimed in claim 12 wherein the width of each of said channels is substantially equal to the diameter of said optical fibers.

17. A device as claimed in claim 12 wherein the bottoms of said channels lie at a distance from said axis substantially equal to the radius of said optical fibers.

18. A device as claimed in claim 12 wherein two channels respectively communicating opposite openings with respect to said axis are adjacent.

19. A device as claimed in claim 12 comprising means for holding said optical fibers in proximity to said dividing member in a coplanar and parallel fashion.

20. A device as claimed in claim 12 comprising a second dividing element parallel and superposable on said other dividing element.

* * * * *